(12) United States Patent
Melki-Delcasse et al.

(10) Patent No.: US 11,407,619 B2
(45) Date of Patent: Aug. 9, 2022

(54) DEMOUNTING AID

(71) Applicant: BA France S.A.S., Colomiers (FR)

(72) Inventors: Dominique Melki-Delcasse, Colomiers (FR); Julien Rochereau, Tournefeuille (FR)

(73) Assignee: BA France S.A.S., Colomiers (FR)

( * ) Notice: Subject to any disclaimer, the term of this patent is extended or adjusted under 35 U.S.C. 154(b) by 65 days.

(21) Appl. No.: 16/647,289

(22) PCT Filed: Nov. 30, 2017

(86) PCT No.: PCT/EP2017/081013
§ 371 (c)(1),
(2) Date: Mar. 13, 2020

(87) PCT Pub. No.: WO2019/052675
PCT Pub. Date: Mar. 21, 2019

(65) Prior Publication Data
US 2020/0216293 A1 Jul. 9, 2020

(30) Foreign Application Priority Data
Sep. 14, 2017 (FR) ...................................... 1758535

(51) Int. Cl.
*B66C 1/40* (2006.01)
*B64F 5/00* (2017.01)

(52) U.S. Cl.
CPC . *B66C 1/40* (2013.01); *B64F 5/00* (2013.01)

(58) Field of Classification Search
CPC ... B66C 13/06; B66C 1/40; B66C 1/44; B64F 5/00; G01L 1/22
See application file for complete search history.

(56) References Cited

U.S. PATENT DOCUMENTS

| 3,827,514 A | * | 8/1974 | Bradley | .................... B66C 1/40 |
| | | | | 177/147 |
| 5,639,197 A | | 6/1997 | Cummins et al. | |
| 6,073,496 A | | 6/2000 | Kuehn et al. | |

FOREIGN PATENT DOCUMENTS

| DE | 62561 | 6/1892 |
| EP | 0430384 | 6/1991 |

(Continued)

OTHER PUBLICATIONS

Machine translation of EP0430384 from Espacenet, retrieved Jun. 15, 2021, published Jun. 1991.*

(Continued)

*Primary Examiner* — Octavia Davis Hollington
(74) *Attorney, Agent, or Firm* — Pauly, DeVries Smith & Deffner LLC

(57) ABSTRACT

Various embodiments relate to a demounting aid for demounting a hoisting fitting from a workpiece, such as from an aircraft structural component, comprising a first connector and a second connector, a force measurement device for measuring the force applied between the first connector and the second connector, a display for displaying an information corresponding to the respective force applied between the first connector and the second connector and at least one elastic member which allows a relative movement of the first connector to the second connector when an increasing force is applied to the first connector and the second connector.

20 Claims, 3 Drawing Sheets

(56) References Cited

FOREIGN PATENT DOCUMENTS

EP      2308791         4/2011
KR      100769321 B1 *  10/2007
WO      2019052675      3/2019

OTHER PUBLICATIONS

"International Preliminary Report on Patentability," for PCT Application No. PCT/EP2017/081013 dated Mar. 17, 2020 (7 pages).
"International Search Report and Written Opinion," for PCT Application No. PCT/EP2017/081013 dated May 8, 2018 (14 pages).

* cited by examiner

DEMOUNTING AID

CROSS-REFERENCE TO RELATED APPLICATIONS

This application is a national stage application under 35 U.S.C. 371 of International Patent Application Serial No. PCT/EP2017/081013, entitled "Demounting Aid," filed Nov. 30, 2017, which claims priority from French Patent Application No. FR 1758535, filed Sep. 14, 2017, the disclosure of which is incorporated herein by reference.

FIELD OF THE TECHNOLOGY

The disclosure is directed to a demounting aid for demounting a hoisting fitting from a workpiece, such as from an aircraft structural component, a connection arrangement, and a method for demounting a hoisting fitting from a workpiece.

BACKGROUND

It is well known in the state of the art to mount hoisting fittings to aircraft structural components in order to move them of or onto for example a support frame. These hoisting fittings are usually mounted to the aircraft structural components via dowel bolts. Since the weight of the hoisting fittings is relatively high in order to demount it from an aircraft structural component by loosening the dowel bolts the weight of the hoisting fitting has to be compensated with a lifting equipment. If this is not done, the dowel bolts tend to jam and cannot be pulled out.

Most commonly for the compensation of the weight of the hoisting fittings a crane is used. However, cranes are designed to control the displacement of workpieces, but not to apply a predefined load for compensating the weight of the hoisting fitting.

SUMMARY

Since it is very difficult to set the appropriate load of a crane for the operator, the attempts of the operator to compensate the weight applied to the hoisting fitting with the weight of the hoisting fitting usually ends in a situation where not enough load is applied, thus it is impossible to manually remove the dowel bolts and the operator sets a further displacement of the main crane, which is leading to the second situation, in which too much load is applied and it is difficult or impossible to manually remove the dowel bolts. Additionally, in this situation risk of damaging the aircraft structural component by loosening the dowel bolts is relatively high.

Therefore a spring has been developed, which, when arranged between the hook of a crane and the hoisting fitting, can improve the demounting of the hoisting fitting because it enables the operator of a crane to more accurately set the applied load. The spring enables more flexibility, since a minimum movement of the crane leads to a smaller load increase with the spring than without and, if the spring comprises a visual indicator which shows when the target load value is reached, makes the setting easier.

However, in case of large aircraft structural components it is difficult for the operator to set the target load force with the crane control because the hoisting fitting and/or the spring cannot properly be seen from the position of the operator of the crane.

It is therefore an objective of the disclosure to improve the known demounting aid in such a way, that the target load force can better and more comfortable be adjusted.

The above noted objective is achieved for a demounting aid by the features disclosed herein.

The idea is to provide a demounting aid for demounting a hoisting fitting from a workpiece, such as from an aircraft structural component, which comprises a first connector and a second connector. With the two connectors, the demounting aid can be arranged between the hook of the crane and the hoisting fitting. Thus, a force transmission chain is established between the hook and the hoisting fitting.

The demounting aid further comprises a force measurement device for measuring the force applied to the first connector and the second connector. This enables the operator to more easily set a target load value to the hoisting fitting by operating the crane. The demounting aid further comprises a, in some embodiments remote, display for displaying an information to the respective force applied between the first connector and the second connector. Thereby; the operator can adjust the target load value based on the information displayed in the display and does not need clear view to the demounting aid, what is of particular importance if the workpieces are of large dimensions, as is the case with aircraft structural components.

Since the demounting aid comprises at least one elastic member, such as at least one spring, which allows a relative movement of the first connector to the second connector when an increasing force is applied to the first connector and the second connector, additional flexibility is provided. This makes it easy to adjust the load applied by actuating the crane.

In various embodiments, a force measurement device and the at least one elastic member are connected in series and/or in parallel.

Further embodiments relating to the elastic members are described and embodiments with features of the force measurement device are also described. According to various embodiments a guiding may be provided.

Some embodiments regarding the displaying of the information corresponding to the force applied are described.

Further embodiments of the demounting aid are described.

Additionally, the above noted objective is solved by the connection arrangement described herein.

The same advantages can apply as described in connection with the demounting aid. Reference is made to the features described in conjunction with the demounting aid.

A optional characteristic of the demounting aid in relation to the weight of the hoisting fitting is described.

Additionally, the above noted objective is solved with the method described herein.

Reference is made to the description of the demounting aid as well as the connection arrangement. The same advantages are achieved with the method as described in conjunction with the demounting aid and the connection arrangement.

Various embodiments provide a demounting aid for demounting a hoisting fitting from a workpiece, such as from an aircraft structural component, comprising a first connector and a second connector, a force measurement device for measuring the force applied between the first connector and the second connector, a, optionally remote, display for displaying an information corresponding to the respective force applied between the first connector and the second connector and at least one elastic member which allows a relative movement of the first connector to the second connector when an increasing force is applied to the first connector and the second connector.

In various embodiments, the force measurement device and the at least one elastic member are connected in series and/or in parallel.

In various embodiments, the demounting aid comprises a plurality of, such as at least three or exactly three, elastic members, which are connected in parallel and/or which have essentially equal characteristics, such as equal spring characteristics.

In various embodiments, the elastic members are connected in parallel via a lower plate and a top plate, more so, that the lower plate and/or the top plate comprise an opening which allows the force measurement device to travel at least partly through the lower plate and the top plate, respectively, while an increasing external force is applied to the first connector and the second connector.

In various embodiments, the at least one elastic member is formed by at least one spring, such as at least one helical spring.

In various embodiments, the at least one elastic member is formed by at least one compression spring and/or tension spring.

In various embodiments, the at least one elastic member is compressed when the first connector and the second connector are pulled apart by a force applied to the first connector and the second connector or that the at least one elastic member is extended when the first connector and the second connector are pulled apart by a force applied to the first connector and the second connector.

In various embodiments, the elastic members are arranged such that their longitudinal axes are arranged in fold rotational symmetry, such as in an at least threefold rotational symmetry, more so, in exactly a threefold rotational symmetry, around the force measurement device, such as, that the symmetry axis of the at least threefold rotational symmetry is the axis on which an external force is applied via the first connector and the second connector to the demounting aid.

In various embodiments, the force measurement device is a, in some embodiments electronic, weighting device, such as a crane scale.

In various embodiments, the force measurement device comprises a strain gauge for determining the force applied.

In various embodiments, the demounting aid comprises a guiding for guiding the relative movement of the first connector and the second connector to each other when an increasing force is applied to the connectors, such as, that the guiding comprises at least one guiding-element which is arranged in an elastic member.

In various embodiments, the remote display is wirelessly connected with the force measurement device and that the information corresponding to the force applied between the first connector and second connector is a force value and/or a weight value corresponding to the force applied and/or the difference to a preset force value and/or an information indicating whether the force applied is higher or lower than a preset value.

In various embodiments, the demounting aid comprises at least one stop for limiting the force applied to the elastic members and/or that the demounting aid comprises a recording element for recording overloads applied to the demounting aid.

In various embodiments, the demounting aid comprises at least one, or at least two, handles for handling the demounting aid.

In various embodiments, the at least one elastic member, such as the plurality of elastic members is/are hosted by a housing, such as by a common housing.

Various embodiments provide a connection arrangement comprising a workpiece, such as an aircraft structural component, a hoisting fitting mounted to the workpiece by at least one dowel bolt and a demounting aid according to the disclosure connected to the hoisting fitting.

In various embodiments, the demounting aid is designed such that, when the load applied to the first connector and the second connector is increased by 10% of the weight force of the hoisting fitting, the relative movement of the first connector to the second connector is between 0.1 cm and 3 cm, such as between 0.5 cm and 2 cm, or approximately 1 cm.

Various embodiments provide a method for demounting a hoisting fitting from a workpiece, such as from an aircraft structural component, comprising the steps: connecting a demounting aid according to the disclosure to the hoisting fitting and to a connector of a lifting equipment, such as a crane hook, lifting the connector of the lifting equipment until the force applied to the first connector and the second connector of the demounting aid approximately equals the weight force of the hoisting fitting, loosening the at least one dowel bolt from the workpiece.

BRIEF DESCRIPTION OF THE DRAWINGS

In the following various aspects will be described based on an example with reference to the drawings. In the drawings

DETAILED DESCRIPTION

Figure 1:
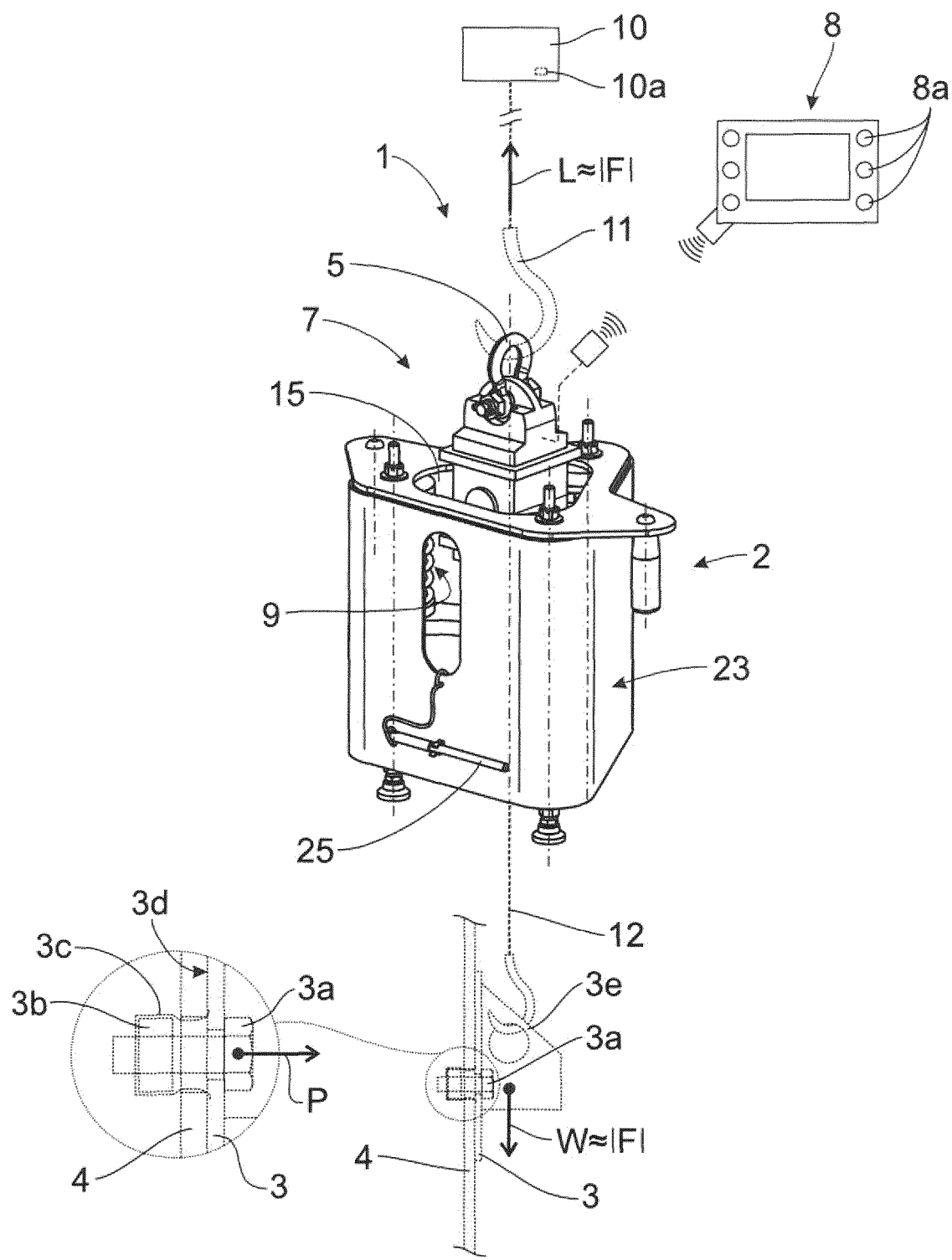
FIG. 1 shows the proposed connection arrangement with the proposed demounting aid in a schematic view.

In FIG. 1 a proposed connection arrangement 1 with a proposed demounting aid 2 is shown. The demounting aid supports the demounting of a hoisting fitting 3 from a workpiece 4. The hoisting fitting 3 is mounted to the workpiece 4 via one or more dowel bolts 3a.

The workpiece 4 may be an aircraft structural component, like for example a hull section and/or a wing section and/or a stringer of an aircraft.

In the aircraft industry such workpieces 4 are usually moved within the factory building by a lifting equipment such as the factory buildings main crane. This lifting equipment is designed to carry and move, respectively, these large and heavy workpieces 4 within the factory building from one working station, such as assembly station, or storage station to another. It is also used to take the workpiece 4 from a frame, on which the workpiece 4 may has been transported. For carrying the workpiece 4 with the crane, hoisting fittings 3 are mounted to the workpiece 4 and the crane is connected to the workpiece 4 via the hoisting fittings 3 during carrying.

Here the hoisting fitting 3 is mounted to the workpiece 4 via at least one dowel bolt 3a and at least one nut 3b. The nut 3b is here connected to the workpiece 4 via a connection member 3c, which may comprise a mechanical rotation lock for the nut 3b relative to the workpiece 4. For example the nut 3b and the connection member 3c may be designed as a cage nut, where the connection member 3c forms the cage for the nut 3b.

Hoisting fittings 3 are usually used to connect the workpiece 4 with a lifting equipment 10, such as a crane, for moving said workpiece 4. The hoist fitting 3 usually comprises a connection surface 3d and a mounting member 3e. When the hoisting fitting 3 is mounted to the workpiece 4 the connection surface lays onto the surface of the workpiece 4. The hoisting fitting 3 and the workpiece 4 are mounted to each other with one or more dowel bolts 3a, which are pushed through corresponding openings of the hoisting fitting 3 and the workpiece 4 and a nut 3b is applied to the dowel bolt 3a, as can be seen in the enlarged view of FIG. 1.

After the workpiece 4 has been moved and when the hoisting fitting 3 is not needed anymore, it has to be demounted. The demounting aid 2 of the disclosure can be designed to facilitate this demounting.

As shown in FIG. 1 the demounting aid 2 comprises a first connector 5 and a second connector 6. The first connector 5 and/or the second connector 6 may be a hook or an eyelet.

The demounting aid 2 further comprises a force measurement device 7 for measuring the force applied between the first connector 5 and the second connector 6. As further can be seen in FIG. 1 the demounting aid comprises a remote display 8 for displaying an information corresponding to the respective force applied between the first connector 5 and the second connector 6.

Additionally, the demounting aid 2 comprises at least one elastic member 9, in the embodiment of the figures three elastic members 9, which allow a relative movement of the first connector 5 to the second connector 6 when an increasing force F is applied to the first connector 5 and the second connector 6. The force F applied is here an external force.

The external force F may be provided by the lifting equipment 10, for example the crane. The combination of the force measurement device 7 and the elastic member 9 allows an operator to adjust the force F applied to a hoisting fitting 3 while demounting it from a workpiece 4 in a comfortable and efficient manner.

While the force measurement device 7 in combination with the remote display 8 provides precise information regarding the respective force applied and the at least one elastic members provides flexibility and thus allows a precise adjustment of the load applied to the hoisting by controlling the lifting equipment.

The hoisting fitting 3 is demounted from the workpiece 4 with the following steps. The demounting aid 2 is first connected to the hoisting fitting 3 and to a connector 11 of a lifting equipment 10, such as the crane hook. The demounting aid 2 may be connected to the connector 11 of the lifting equipment 10 and/or the hoisting fitting 3 directly or via a lifting belt 12 or the like.

Then the connector 11 of the lifting equipment 10 is lifted until the force F applied to the first connector 5 and the second connector 6 of the demounting aid 2 approximately equals the weight force W of the hoisting fitting 3. Then the dowel bolt 3a or dowel bolts 3a are loosened from the workpiece 4. Here the connector 11 of the lifting equipment 10 is lifted until the force F, in particular the tension force F, applied to the first connector 5 and the second connector 6 of the demounting aid 2 approximately equals the weight force W of the hoisting fitting 3 plus the weight force of those parts of the demounting aid 2 itself, which are carried by the force measurement device 7 when in use. Then the dowel bolt 3a or dowel bolts 3a are loosened from the workpiece 4. "Approximately equals" here means that the difference between the force F applied and the weight force of the hoisting fitting 3 is less than 20%, less than 10%, less than 5%, or less than 1% of the weight force of the hoisting fitting 3.

Here the difference between the weight force W of the hoisting fitting 3 plus possibly the weight force of those parts of the demounting aid 2 itself, which are carried by the force measurement device 7, and the force F applied to the first connector 5 and the second connector 6 is less than 170 N, less than 100 N, less than 50 N, or less than 10 N. The lower the difference, the easier is the loosening and the pulling out of the dowel bolt 3a.

This can be seen from the following calculation with reference to FIG. 1. The hosting fitting 3 weight results in a weight force W. It is attached to the workpiece 4 with a number N of dowel bolts 3a. As explained before, the hoisting fitting weight force W shall be compensated by a lifting equipment 10 which therefore applies a vertical lifting load L approximately corresponding to the force F between the first connector 5 and the second connector 6.

Dowel bolts 3a are then loosened by the operator with a wrench or a machine: After loosening, there is no more friction between the hoisting fitting 3 and the workpiece 4. Therefore, each dowel bolt 3a (i) is submitted to a vertical load V(i), which can be positive or negative (depending on the force F applied via the lifting equipment 10), approximated by:

$$V^{(i)}=(W-L)/N$$

When only one dowel bolt 3a remains, it supports all the vertical load:

$$V^{(N)}=(W-L) \quad (1)$$

This last dowel bolt 3a (N) needs to be extracted to unmount the hoisting fitting 3:

To manually extract the last dowel bolt, the operator has to apply a pulling force $P^{(N)}$ described as:

$$P^{(N)} > IV^{(N)}I^*f_h+f_w) \quad (2)$$

with:

$f_h$: friction coefficient between the dowel bolt 3a and the hoisting fitting 3

$f_w$: friction coefficient between the dowel bolt 3a and the workpiece 4 (aircraft structure)

Both friction coefficients have typically values between 0.1 (lubricated contact) and 0.5 (galled contact).

Inserting (1) into (2) leads to:

$$IW-LI^*(f_h+f_w)<p^{(N)}$$

Considering the typical maximum manual pulling load max(P(N)) an operator can apply is approximately 200 N, it can be estimated that the acceptable accuracy of the lifting load, for lubricated bolts (f«0.1) and galled bolts (f*0.6) is:

$$W+(\max(P^{(N)}))I(f_h+f_w)>L>W-(\max\{P^{(N)}\})I(f_h+f_w)$$

if $f_h=f_w=0.1$ $$W+1000N<L<W-1000N$$

if $f_h=f_w=0.6$ $$W+166N<L<W-166N$$

The accuracy to set the lifting load L in order to ensure manual extraction shall approximately be at least +/−166 N, which is approximately +/−16 kg.

This is much less than the typical accuracy of a load measurement 10a of a crane for handling the workpiece 4, since the load measurement accuracy of cranes is usually approximately 2%-3% of the maximum work load, which in case of cranes in factory buildings for the production of aircrafts is very high. Accordingly, the accuracy of the force measurement device 7 of the demounting aid 2 can be at least 100 times, at least 1000 times, or at least 10000 times, higher than the accuracy of the load measurement 10*a* of the lifting equipment 10, which is used to apply the force F.

In various embodiment, the accuracy of the weight measurement device 7 is below 10 N, below 1 N, or below 0.1 N, as it is the case in the embodiment shown in the figures.

In the embodiment of the drawings, the force measurement device 7 and the at least one elastic member 9 are connected in series. In an alternative embodiment the at least one elastic member 9 and the force measurement device 7 may also be connected in parallel. In case a plurality of elastic members 9 is supplied, some might be connected in series to the force measurement device 7, whereas others are connected in parallel.

Figure 2:
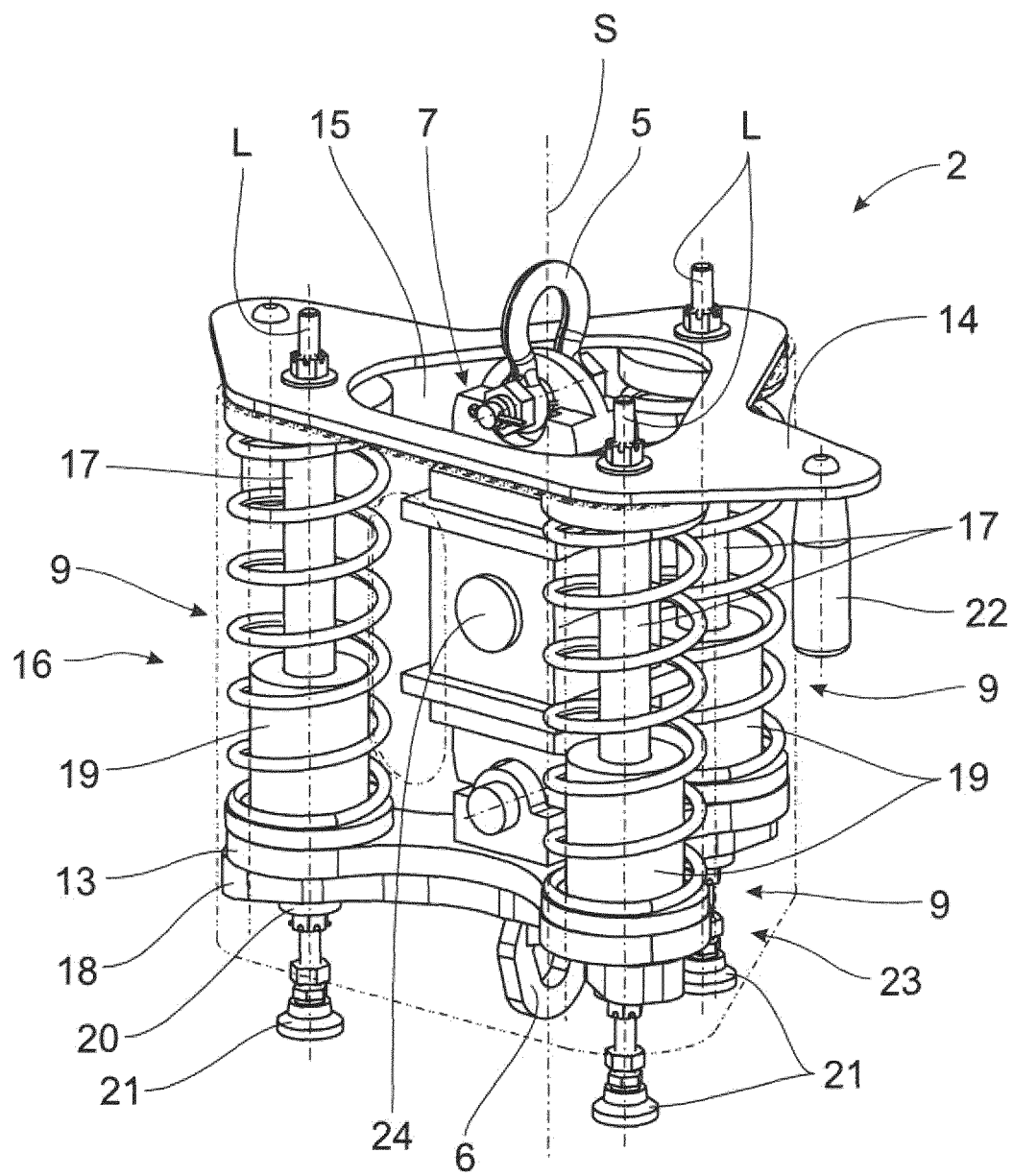
FIG. 2 shows a three-dimensional schematic view of the demounting aid and FIG. 3 shows a side view of the demounting aid of FIG. 2 in a) a uncompressed state and b) a compressed state during use.

Here the elastic members 9 are springs, especially helical springs. Here they are designed as compression springs. Alternatively, in another embodiment, they may be designed as tension springs. In the embodiment of the figures the demounting aid 2 comprises three elastic members 9, as shown in FIG. 2. It may also comprise additional elastic members 9.

Here the elastic members 9 are connected in parallel and have essentially equal characteristics, such as equal spring characteristics.

In various embodiments, the demounting aid 2 is designed such that, when the load applied to the first connector 5 and the second connector 6 is increased by 10% of the weight force of the hoisting fitting 3, the relative movement of the first connector 5 to the second connector 6 is between 0.1 cm and 3 cm, between 0.5 cm and 2 cm, or approximately 1 cm.

As can be seen from FIG. 2 the elastic members 9 are connected in parallel via a lower plate 13 and a top plate 14. In the embodiment the top plate 14 comprises an opening 15 which allows the force measurement device 7 to travel at least partly through the top plate 14 while an increasing external force F is applied to the first connector 5 and the second connector 6. Additionally or alternatively the opening 15 may be in the lower plate 13 and then allowing the force measurement device 7 to travel at least partly through the lower plate 13 while an increasing external force F is applied.

The elastic member 9 may be preloaded when no external force F is applied to the demounting aid 2. However, in the embodiments no preload is applied to the elastic members 9.

Figure 3:
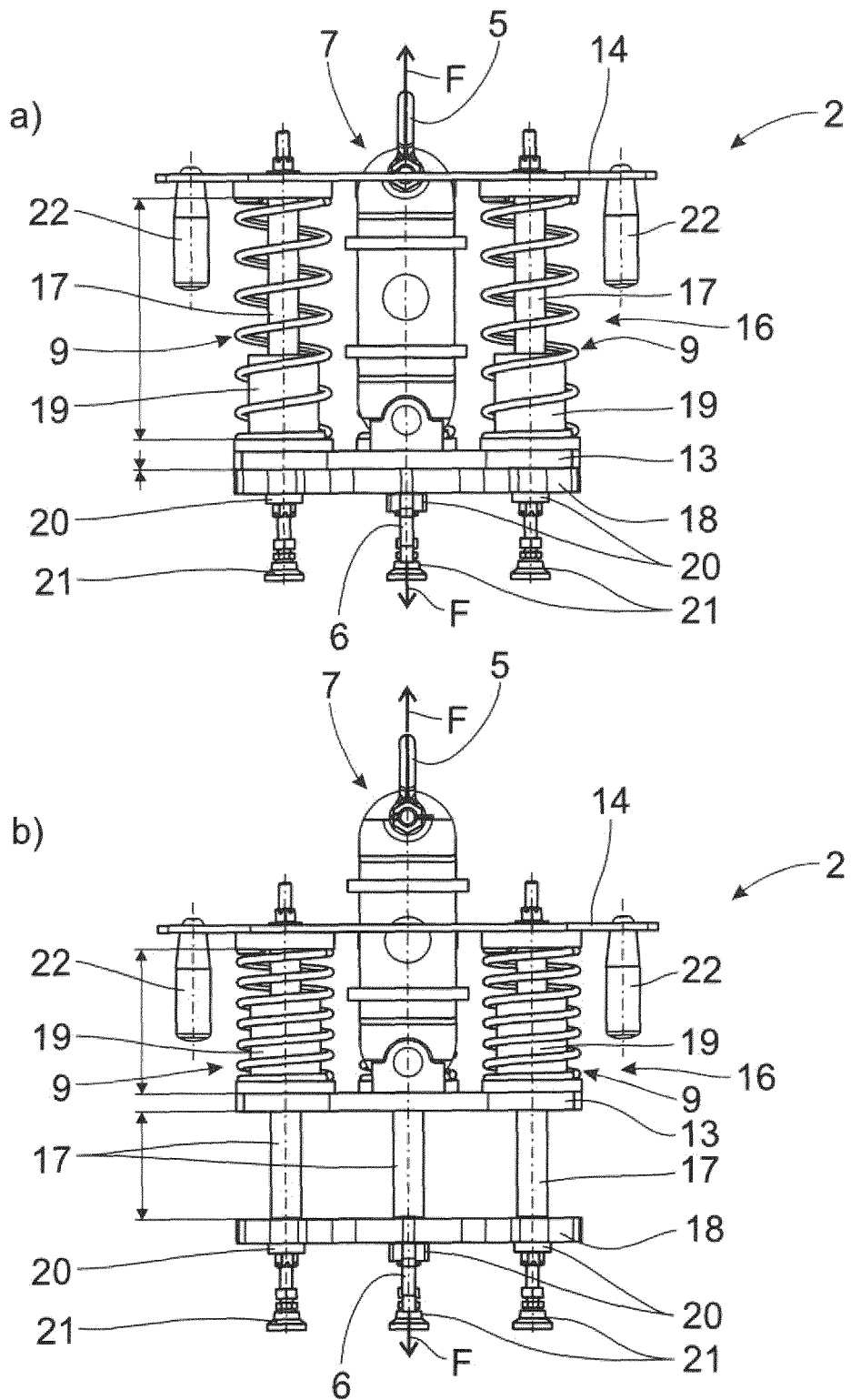

As can be seen in FIG. 3 the at least one elastic member 9 is compressed when the first connector 5 and the second connector 6 are pulled apart by a force F externally applied to the first connector 5 and the second connector 6. Alternatively, in another embodiment the at least one elastic member 9 may be extended when the first connector 5 and the second connector 6 are pulled apart by a force F applied to the first connector 5 and the second connector 6. In further alternative embodiments, the at least one elastic member is compressed when the first connector 5 and the second connector 6 are pushed towards each other by a force applied to the first connector 5 and the second connector 6 or the at least one elastic member 9 is extended when the first connector 5 and the second connector 6 are pushed towards each other by a force F applied to the first connector 5 and second connector 6.

As can be seen in FIG. 2 the elastic members 9 are arranged in such a way that their longitudinal axes L are arranged in fold rotational symmetry. The demounting aid 2 of the embodiment comprises three elastic members 9 and the longitudinal axes of these three elastic members 9 are of three-fold rotational symmetry around the force measurement device 7. The symmetry axis S is in the embodiment the axis on which the external force F is applied to the demounting aid 2 via the first connector 5 and the second connector 6. Further, here the symmetry axis S is coaxial with the longitudinal axis of the force measurement device 7.

The demounting aid 2 comprises a guiding 16 for guiding the relative movement of the first connector 5 and the second connector 6 to each other when an increasing force F is applied to the connectors 5, 6. In various embodiments, the guiding 16 comprises at least one guiding-element 17, which is arranged in an elastic member 9.

In the embodiment the guiding-elements 17 connect the top plate 14 and the base plate 18. The longitudinal axes of the guiding-elements 17 are coaxial to the longitudinal axes of the elastic members 9. Hereby the top plate 14, the guiding-elements 17 and the base plate 18 form a rigid structure. The lower plate 13 is moveable relative to the top plate 14 and the guiding-elements 17 extend through openings of the lower plate 13.

Furthermore, the demounting aid 2 may comprise at least one stop 19 for limiting the force applied to the elastic members 9. Here the stops 19 provide a safeguard, since they limit the force applicable to the elastic members 9. A failure of elastic members 9 is efficiently prevented as well as an accidental falling of the hoisting fitting 3 because of such a failure.

Here three stops 19 are arranged around the guiding-elements 17 and form a part of the guiding-elements 17.

Additionally or alternatively, recording elements 20 may be provided which record an overload applied to the demounting aid 2.

The recording elements 20 allow to record the application of an overload provable. Thus, misuse can more easily be proved. As recording elements 20 for example grub screws may be used.

As shown in FIGS. 2 and 3 the force measurement device 7 can be, pivotable around an axis essentially orthogonal to the direction of the gravitational force, connected to the lower plate 13.

The force measurement device 7 can be an electronic weighting device. It may be a crane scale. For measuring the force F applied to the demounting aid 2 the force measurement device 7 may comprise a strain gauge. Additionally or alternatively, the force measurement device 7 may comprise a capacitive sensor and/or piezoresistive sensor and/or a distance sensor.

Here the force measurement device 7 further comprises a communication unit 16 for remotely communicating with the remote display 8. Via the communication unit 16 the remote display 8 is here wirelessly, such as via a wifi-network, connected with the force measurement device 7.

The remote display 8 may comprise input elements 8*a* and/or a touch screen for configuration auf the force measurement device 7. In various embodiments, the force measurement device 7 is configurable for different types of hoisting fittings 3 via the remote display 8. It displays an information corresponding to the force applied between the first connector 5 and the second connector 6. This enables the operator of the lifting equipment 10 to adjust the force F applied to the demounting aid 2 and the hoisting fitting 3 in order to reach the target force for the hoisting fitting 3.

In various embodiments, the target force is approximately the weight force of the hoisting fitting 3 to be demounted.

The information displayed corresponding to the force applied may be a force value and/or a weight value corresponding to the force applied and/or the difference to a preset force value and/or an information indicating whether the force applied is higher or lower than the preset force value. The preset force value here corresponds to the target load value and/or the weight force of the hoisting fitting 3.

Here the first connector 5 is pivotably connected to the force measurement device 7. Additionally or alternatively, the first connector 5 and/or the second connectors 6 may be connected to the demounting aid 2 in a rotational manner around a rotation axis which is essentially parallel to the direction of a gravitational force G.

The force transmission chain within the demounting aid 2 extends here from the first connector 5 to the force measurement device 7. From the force measurement device 7 the force transmission chain extends via the lower plate 13 into the elastic members 9. From the elastic members 9 the force transmission chain extends via the top plate 14 into the guiding-elements 17 and further into the base plate 18. From the base plate 18 it extends to the second connector 6, where it exits the demounting aid 2.

In the embodiment the demounting aid 2 comprises feet 21 to store the demounting aid 2. Their extension in the direction of the gravitational force G is larger than the extension of the second connector 6. They are fixed to the base plate 20 of the demounting aid 2, as can be seen in FIGS. 2 and 3.

The demounting aid 2 may additionally or alternatively comprise one or more handles 22. Here the demounting aid 2 comprises two handles 22. In the embodiment they are fixed to the top plate 15.

As shown in FIG. 1 the demounting aid 2 comprises a housing 23. The housing 23 houses the elastic members 9. Thereby, the housing 23 prevents operators from putting their fingers into the springs. Thus, injuries can sufficiently be prevented. Here not only the elastic members 9, but also the force measurement device 7 is accommodated at least partly within the housing 23. The elastic members 9 and the force measurement device 7 may also be at least partly be arranged between the top plate 14 and the base plate 18.

In the embodiment of FIG. 1 to 3 the force measurement device 7 comprises the on and/or off switch 24 for the demounting aid 2. In order to improve the access to the on and/or off switch 24 a bar 25 is detachably mounted to the housing 23 for switching on and/or off the demounting aid 2. Alternatively, the on and/or off switch 24 may be mounted to the housing 23.

The demounting aid 2 of the embodiment has a maximum workload of approximately 200 kg. The weight is approximately 12 kg. The demounting aid 2 may also be designed for higher maximum workloads, like approximately 1000 kg. Here the device is CE certified as per 2006/42 requirements.

The invention claimed is:

1. A demounting aid for demounting a hoisting fitting from a workpiece, comprising
a first connector and a second connector,
a force measurement device for measuring the force applied between the first connector and the second connector,
a remote display for displaying an information corresponding to the respective force applied between the first connector and the second connector
and at least one elastic member which allows a relative movement of the first connector to the second connector when an increasing force is applied to the first connector and the second connector.

2. The demounting aid according to claim 1, wherein the force measurement device and the at least one elastic member are connected in series and/or in parallel.

3. The demounting aid according to claim 1, wherein the demounting aid comprises a plurality of at least three elastic members, which are connected in parallel and/or which have essentially equal spring characteristics.

4. The demounting aid according to claim 3, wherein the elastic members are connected in parallel via a lower plate and a top plate, that the lower plate and/or the top plate comprise an opening which is configured to allow the force measurement device to travel at least partly through the lower plate and the top plate, respectively, while an increasing external force is applied to the first connector and the second connector.

5. The demounting aid according to claim 3, wherein the elastic members are arranged such that their longitudinal axes are arranged in fold rotational symmetry, in an at least threefold rotational symmetry, in exactly a threefold rotational symmetry, around the force measurement device, that the symmetry axis of the at least threefold rotational symmetry is the axis on which an external force is applied via the first connector and the second connector to the demounting aid.

6. The demounting aid according to claim 1, wherein the at least one elastic member is formed by at least one spring.

7. The demounting aid according to claim 1, wherein the at least one elastic member is formed by at least one compression spring and/or tension spring.

8. The demounting aid according to claim 1, wherein the at least one elastic member is compressed when the first connector and the second connector are pulled apart by a force applied to the first connector and the second connector or that the at least one elastic member is extended when the first connector and the second connector are pulled apart by a force applied to the first connector and the second connector.

9. The demounting aid according to claim 1, wherein the force measurement device is an electronic weighting device.

10. The demounting aid according to claim 1, wherein the force measurement device comprises a strain gauge for determining the force applied.

11. The demounting aid according to claim 1, wherein the demounting aid comprises a guiding for guiding the relative movement of the first connector and the second connector to each other when an increasing force is applied to the connectors, wherein the guiding comprises at least one guiding-element which is arranged in an elastic member.

12. The demounting aid according to claim 1, wherein the remote display is wirelessly connected with the force measurement device and that the information corresponding to the force applied between the first connector and second connector is a force value and/or a weight value corresponding to the force applied and/or the difference to a preset force value and/or an information indicating whether the force applied is higher or lower than a preset value.

13. The demounting aid according to claim 1, wherein the demounting aid comprises at least one stop for limiting the force applied to the elastic members and/or that the demounting aid comprises a recording element for recording overloads applied to the demounting aid.

14. The demounting aid according to claim 1, wherein the demounting aid comprises at least one handle for handling the demounting aid.

15. The demounting aid according to claim 1, wherein the at least one elastic member is hosted by a housing.

16. A connection arrangement comprising a workpiece, a hoisting fitting mounted to the workpiece by at least one dowel bolt and a demounting aid according to claim 1 connected to the hoisting fitting.

17. The connection arrangement according to claim 16, wherein the demounting aid is designed such that, when the load applied to the first connector and the second connector is increased by 10% of the weight force of the hoisting fitting, the relative movement of the first connector to the second connector is between 0.1 cm and 3 cm.

18. A method for demounting a hoisting fitting from a workpiece, comprising the steps:
   connecting a demounting aid according to claim 1 to the hoisting fitting and to a connector of a lifting equipment,
   lifting the connector of the lifting equipment until the force applied to the first connector and the second connector of the demounting aid approximately equals the weight force of the hoisting fitting,
   loosening the at least one dowel bolt from the workpiece.

19. The demounting aid according to claim 1, wherein the at least one elastic member is formed by at least one helical spring.

20. The demounting aid according to claim 1, wherein the force measurement device is a crane scale.

\* \* \* \* \*